W. VINE.
Meat Cutter.
No. 23,966. Patented May 10, 1859.
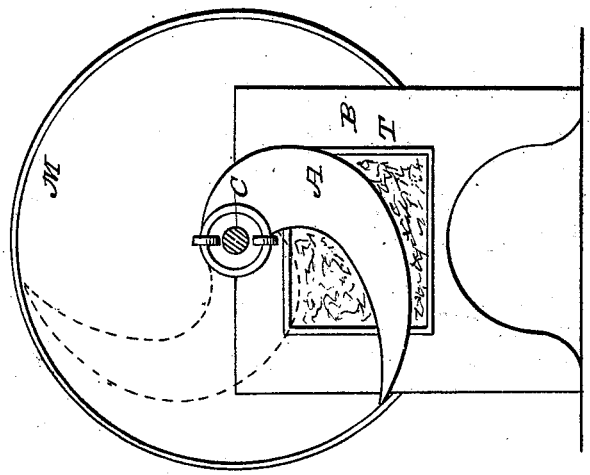
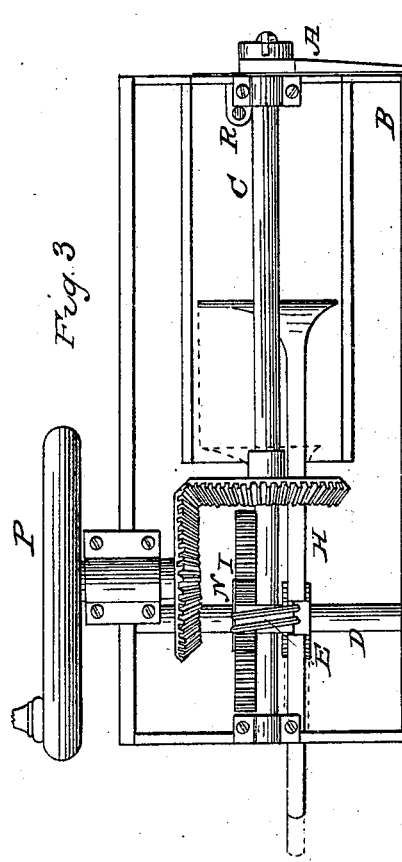
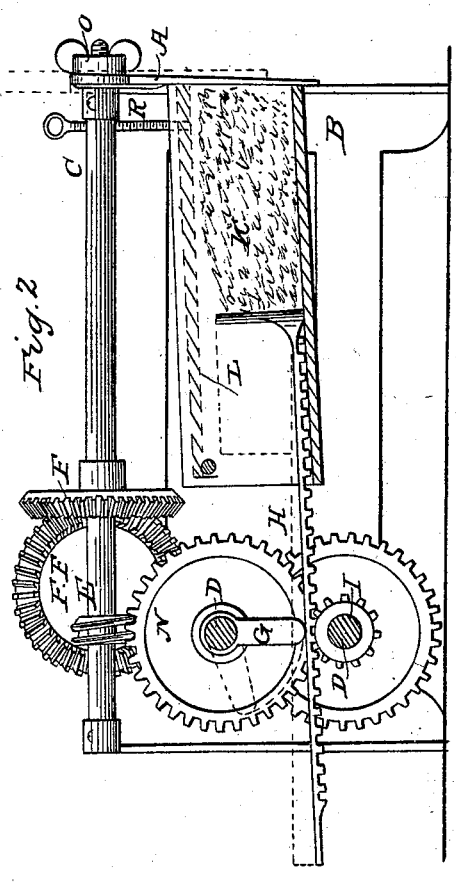

UNITED STATES PATENT OFFICE.

WILLIAM VINE, OF HARTFORD, CONNECTICUT.

MEAT-SLICER.

Specification of Letters Patent No. 23,966, dated May 10, 1859.

*To all whom it may concern:*

Be it known that I, WILLIAM VINE, of the city of Hartford, county of Hartford, and State of Connecticut, have invented a new and useful Machine for Cutting Smoked and Dried Meat into Thin Slices for the Use of the Table; and I do hereby declare that the following is a correct description of the same, reference being had to the accompanying drawing and to the letters of reference marked thereon.

The nature of my invention consists, in the peculiar arrangement for feeding or forcing the meat forward to be cut by a rotating knife.

To enable others skilled in the art to make and use my invention I will proceed to describe its construction and operation.

The drawing Figure 1 is an end view showing the knife. Fig. 2 is section with gears feeder, &c. Fig. 3 is plan view of the same.

I make a frame of metal B, of the necessary size to contain the works comprising the machine. The knife A I make with the periphery of the edge of an involute curved form which in rotating gives a peculiar sliding cut. This knife A is fitted on the end of the longitudinal shaft C, and fastened with the thumb nut O, which allows the same to be easily taken off to be sharpened. On this longitudinal shaft C, I fix the miter gear wheel F, to be actuated by the revolving of another miter wheel F, F, connected with the balance wheel and crank P.

In the rear of the miter wheel F on the shaft C, I attach a worm gear E to operate and actuate the gearing and pinions N, I, and the shafts D, D, which are arranged to give a very slow movement to the rack H, for the purpose of forcing and feeding the meat forward in the box K, to be cut into thin slices by the rotating knife A. The rack H works on the lower pinion I which propels it forward very slowly to force the meat under the knife to be sliced, and when it is all or nearly all cut up, the pendant G which is placed over the rack for the purpose of preventing the same from rising out of gear when in motion is to be raised or turned up backward, which will allow the rack H to be lifted out of gear and to be drawn back quickly, preparatory to putting in another piece of meat to the box K to be again operated on.

The box K to contain the meat is made about the size to receive half of a customary piece of smoked beef at a time, or any other suitable size in accordance to the length of the knife A.

The cover L is to put on the meat to keep it down and steady while being sliced, and it is regulated in its pressure by means of the screw R.

M is a light guard on the front to prevent accidental cutting while the knife is revolving.

P, is a balance wheel with handle to actuate the machinery.

The mouth of the feed box K, is beveled outward to form the lip T so as to offer a keen resisting edge for the knife to cut across.

This is a useful and economical method of slicing smoked and dried meat for the table and a considerable saving in the article, also by cutting it across the grain in such thin slices it gives it a tender relish, much superior to the old method.

I do not claim the rotating knife, or the gearing movements, or the box and frame as new.

What I claim as my invention and desire to secure by Letters Patent is—

The beveled lip T and the pendant G, for the purpose described, in combination with the other parts of the dried meat slicer, substantially as herein set forth.

WM. VINE.

Witnesses:
WM. VINE, Jr.,
HENRY C. ROBINSON.